United States Patent [19]
Yamaguchi et al.

[11] Patent Number: 5,986,018
[45] Date of Patent: Nov. 16, 1999

[54] LIQUID CURABLE RESIN COMPOSITIONS

[75] Inventors: Yoshikazu Yamaguchi, Tsukuba; Zen Komiya; Takashi Ukachi, both of Ibaraki, all of Japan

[73] Assignees: DSM N.V., Heerlen, Netherlands; JSR Corporation, Tokyo, Japan

[21] Appl. No.: 09/026,676

[22] Filed: Feb. 20, 1998

[51] Int. Cl.⁶ .................................................. C08F 283/04
[52] U.S. Cl. .................... 525/455; 525/100; 524/379; 524/389; 528/28
[58] Field of Search ...................... 524/379, 389; 525/100, 455; 528/28

[56] References Cited

U.S. PATENT DOCUMENTS

| | | | |
|---|---|---|---|
| 4,130,708 | 12/1978 | Friedlander et al. | 528/28 |
| 4,605,712 | 8/1986 | Mueller et al. | 525/474 |
| 5,182,786 | 1/1993 | Kinaga et al. | |
| 5,650,231 | 7/1997 | Barraud et al. | 428/391 |
| 5,849,811 | 12/1998 | Nicolson et al. | 523/106 |

FOREIGN PATENT DOCUMENTS

| | | |
|---|---|---|
| 0 587 486 A1 | 3/1994 | European Pat. Off. . |
| 91/17198 | 11/1991 | WIPO . |
| 95/23772 | 9/1995 | WIPO . |
| 96/11217 | 4/1996 | WIPO . |
| 97/38035 | 10/1997 | WIPO . |
| 97/46495 | 12/1997 | WIPO . |

*Primary Examiner*—Melvyn I. Marquis
*Assistant Examiner*—Mark W. Milstead
*Attorney, Agent, or Firm*—Pillsbury Madison & Sutro

[57] ABSTRACT

A liquid curable resin composition comprising a dialkylpolysiloxane particles with at least two urethane bonds and/or urea bonds in the terminal groups. The resin composition exhibits superior shelf life in a liquid state and produces cured products having a slippery surface. It is suitable as a coating material for optical fibers, particularly as a ribbon matrix material and a bundling material.

13 Claims, No Drawings

LIQUID CURABLE RESIN COMPOSITIONS

FIELD OF THE INVENTION

The present invention relates to liquid curable resin compositions with excellent shelf life, and more particularly, to liquid curable resin compositions suitable for use as coating materials and for optical fiber ribbon matrix materials, ribbon bundle materials and the like.

BACKGROUND OF THE INVENTION

In the production of coated optical fibers, a resin coating is provided for protection and reinforcement immediately after spinning molten glass fibers. A known structure of the resin coating consists of a primary coating layer of a relatively flexible resin which is coated on the surface of optical fibers and a secondary coating layer of a relatively rigid resin which is provided over the primary coating layer. A so-called optical fiber ribbon is composed of a plurality of these coated optical glass fibers, e.g., four or eight optical fibers, by arranging these fibers typically in a plane and fixing them with a binder material to produce a ribbon structure with a rectangular cross-section. The binder material for preparing the optical fiber ribbon from a plurality of optical fibers is called a ribbon matrix material. A structure composed of a plurality of these ribbons is often referred to as a bundle. The material for binding such a bundle of ribbons is called a bundling material.

In the manufacture of optical fiber ribbons and multiple ribbon bundles it is important that the ribbons and/or bundles manufactured are smoothly wound up and the wound ribbons and/or bundles can be smoothly drawn out at a specific rate to smoothly complete the manufacture of optical fiber cables and/or easily utilize the ribbons/bundles in succeeding steps. Conventionally, a lubricant such as silicone oil or a powder such as talc has been applied to the surface of the ribbon to provide a slippery surface, whereby smooth wind-up and draw-out operations of the optical fiber ribbons and/or bundles are ensured.

Another method to provide good surface slip characteristics is a method of adding an additive such as silicone oil to the ribbon matrix material or the bundling material. Although such additives improve the surface slip characteristics of the cured product, the use of silicone oil or other conventional additives, however, impairs the shelf-life of the composition. Specifically, the addition of a large amount of additives causes the liquid composition to separate into two layers during storage. If the amount of such an additive remains small so that the shelf-life of the compositions remain relatively unaffected, it is necessary to apply a powder such as talc when ribbons are produced, because the cured product does not have sufficient surface slip characteristics.

SUMMARY OF THE INVENTION

Accordingly, it is an objective of the present invention to provide a liquid curable ribbon matrix material and/or a bundling material that maintains a shelf-life comparable to conventional liquid curable compositions while having, when cured, a sufficiently high surface slip characteristic so that no external lubricant is required. More specifically, the curable resin compositions of the present invention should provide compositions that avoid liquid-liquid phase separation and maintain composition distribution after having been stored for long periods of time, while the cured product maintains the same characteristics as possessed at the time of production, when the additive for the improvement of surface property is added.

A further object of the present invention is therefore to provide a liquid curable resin composition having excellent shelf-life, producing cured products with a sufficiently slippery surface, and suitable for use as a coating material for optical fibers, especially as a ribbon matrix material or a bundling material.

The objects of the present invention are provided by a liquid curable resin composition (or dispersion) comprising dispersed particles of a dialkylpolysiloxane compound having at least two terminal groups each having at least one urethane bond and/or urea bond which may be represented, for instance, by Formula (I), as follows:

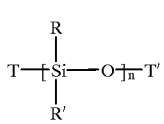

wherein
T and T' independently represent terminal groups comprising at least one urethane or urea bond, preferably terminal groups comprising a urethane or urea bond residue of a curable hydroxy compound or alcohol;
R and R' independently represent alkyl groups, preferably alkyl groups having from 1–4 carbon atoms; and
n represents an integer from 5 to 150, preferably from 8 to 70.

DETAIL DESCRIPTION OF THE INVENTION AND PREFERRED EMBODIMENTS

The dialkylpolysiloxane compound represented by Formula (I) can be prepared by reacting a polyisocyanate with a hydroxy and/or amino terminated dialkylpolysiloxane compound, and an alcohol or a hydroxy compound comprising a curable group (herein also referred to as a curable hydroxy compound), such as a radiation curable hydroxy compound (for instance, a (meth)acrylate compound containing a hydroxyl group).

The urethane bonds and/or urea bonds in the T and T' groups are necessary for particles of the dialkylpolysiloxane compound to be mutually soluble with other components, such as urethane (meth)acrylates and polymerizable monomers containing vinyl or (meth)acryloyl groups, which are hereinafter described. Although not wanting to be limited by any particular theory, it will be appreciated that this mutual solubility may assist the dialkylpolysiloxane particles to form a relatively stable dispersion within a liquid curable resin composition. The urethane bonds and/or urea bonds are formed by the reaction of the isocyanate group of the polyisocyanate with the hydroxyl group or amino group of the dialkylpolysiloxane compound, and the hydroxyl group of the curable hydroxy compound or alcohol.

Given as examples of the polyisocyanates which can be used for this purpose are 2,4-toluene diisocyanate, 2,6-tolylene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylene diisocyanate, tetramethylxylene diisocyanate, and 2,5(or 6)-bis(isocyanatemethyl)bicyclo [2.2.1]heptane. Among these diisocyanates, 2,4-toluene diisocyanate, isophorone diisocyanate, xylene diisocyanate, and methylenebis(4-cyclohexylisocyanate) are particularly preferred. These polyisocyanate compounds are used either individually or in combinations of two or more.

The dialkylpolysiloxane compound used in the present invention can be produced using a silicone compound which has a hydroxyl group or an amino group at both terminals of the dialkylpolysiloxane structure.

Examples of such silicone compounds include α,ω-bis[3-(2'-hydroxyethoxy)-propyl] dimethylpolysiloxane, which is a compound having a 3-(2'-hydroxyethoxy) propyl group at both terminals of the dimethylpolysiloxane structure; and a silicone compound having hydroxyl groups at both terminals such as a dimethylpolysiloxane containing an organic group, e.g., a polyalkylene oxide represented by the formula,

$$—CH_2CH_2CH_2(OCH_2CH_2)_n—OH \quad (1)$$

wherein n is an integer of 1–15; and a silicone compound having a 3-aminopropyl group at both terminals. These silicone compounds may be used either individually or in combinations of two or more.

The silicone compounds having a hydroxyl group at both terminals of the dialkylpolysiloxane structure are commercially available under the trademarks of, for example, Silaplane FM-4411, FM-4421, FM-4425, XT-3000 (manufactured by Chisso Corp.), SF8427, BY-16-005, BY-16-006, BY-16-007, BY-16-008, and BY-16-848 (manufactured by Toray-Dow Corning Co., Ltd.). The silicone compounds having an amino group at both terminals of the dialkylpolysiloxane structure are commercially available under the trademarks of, for example, Silaplane FM-3311, FM-3321, FM-3325, (manufactured by Chisso Corp.), BY-16-853, and BY-16-853B (manufactured by Toray-Dow Corning-Silicone Co., Ltd.).

Examples of suitable curable hydroxy compounds include (meth)acrylates having a hydroxyl group, such as 2-hydroxyethyl (meth)acrylate, 2-hydroxypropyl (meth) acrylate, 2-hydroxybutyl (meth)acrylate, 2-hydroxy-3-phenyloxypropyl (meth)acrylate, 1,4-butanediol mono (meth)acrylate, 2-hydroxyalkyl-(meth)acryloyl phosphate, 4-hydroxycyclohexyl (meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, (meth)acrylates represented by the following structural formulas (2) or (3),

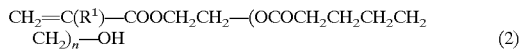

$$CH_2=C(R^1)—COOCH_2CH_2—(OCOCH_2CH_2CH_2CH_2)_n—OH \quad (2)$$

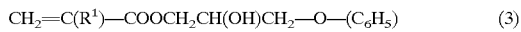

$$CH_2=C(R^1)—COOCH_2CH(OH)CH_2—O—(C_6H_5) \quad (3)$$

wherein $R^1$ represents a hydrogen atom or a methyl group and n represents an integer of 1–15. In addition, compounds obtained by an addition reaction between a compound containing a glycidyl group, such as, alkyl glycidyl ether, allyl glycidyl ether, or glycidyl (meth)acrylate, and (meth) acrylic acid can also be used. Preferred curable hydroxy compounds include (meth)acrylates having a hydroxyl group, particularly desirable are 2-hydroxyethyl acrylate and 2-hydroxy-propyl acrylate. These (meth)acrylates having a hydroxyl group may be used either individually or in combinations of two or more.

The following compounds are given as examples of alcohols: methanol, ethanol, 1-propanol, 2-propanol, n-butanol, iso-butanol, 2-butanol, t-butyl alcohol, allyl alcohol, isoamyl alcohol, cyclohexanol, decyl alcohol, dodecyl alcohol, tridecyl alcohol, nonyl alcohol, and iso-nonyl alcohol. Of these alcohols, ethanol and n-butanol are especially desirable.

The reaction for obtaining the dialkylpolysiloxane compound may be carried out, for example, by i) reacting the silicone compound having reactive terminal groups, the polyisocyanate compound, and the (meth)acrylate having a hydroxyl group (or the alcohol) altogether; ii) reacting the silicone compound and the polyisocyanate compound, and then reacting the resulting product with the (meth)acrylate having a hydroxyl group (or the alcohol); or iii) reacting the polyisocyanate and the (meth)acrylate having a hydroxyl group (or the alcohol), and then reacting the resulting product with the silicone compound. It is preferred that the amount of the hydroxyl or amino groups of the silicone and (meth)acrylate compounds (or the alcohol) is almost equivalent to the isocyanate groups provided by the polyisocyanate compound.

The structure of a polyurethane polyol and the like can be introduced between the dialkylpolysiloxane structure and the (meth)acryloyl group by adding a polyol compound to the starting material of the above reactions. The compounds prepared in this manner can also be used as the dialkylpolysiloxane compound in the present invention.

As the polyol used here, polyether diols, polyester diols, polycarbonate diols, polycaprolactone diols, and the like are given. These polyols may be used either individually or in combinations of two or more. The manner of polymerization of each constitutional unit in these polyols is not specifically limited and may be random polymerization, block polymerization, or graft polymerization.

Given as specific examples of polyether diols are polyethylene glycol, polypropylene glycol, polytetramethylene glycol, polyhexamethylene glycol, polyheptamethylene glycol, polydecamethylene glycol, and polyether diols obtained by the ring-opening copolymerization of two or more ionic-polymerizable cyclic compounds. Examples of the ionic-polymerizable cyclic compound include cyclic ethers such as ethylene oxide, propylene oxide, butene-1-oxide, isobutene oxide, 3,3'-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrine, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidylbenzoate. Specific examples of the combination of two or more types of ionic-polymerizable cyclic compounds are tetrahydrofuran and propylene oxide, tetrahydrofuran and 2-methyltetra-hydrofuran, tetrahydrofuran and 3-methyltetrahydrofuran, tetrahydrofuran and ethylene oxide, propylene oxide and ethylene oxide, butene- 1-oxide and ethylene oxide, and tetrahydrofuran, ethylene oxide and butene-1-oxide. It is also possible to use combinations of the above-mentioned ionic-polymerizable cyclic compounds and a cyclic imine such as ethylene imine, a cyclic lactone such as B-propiolactone and glycolic acid lactide, or a dimethylcyclopolysiloxane. These ring-opening copolymer units of ionic-polymerizable cyclic compounds may be either a random copolymer or a block copolymer.

Polyester diols obtained by the reaction of a polyhydric alcohol and a polybasic acid are given as examples of the polyester diol. Ethylene glycol, polyethylene glycol, propylene glycol, polypropylene glycol, tetramethylene glycol, polytetramethylene glycol, 1,6-hexane diol, neopentyl glycol, 1,4-cyclohexane dimethanol, 3-methyl-1,5-pentane diol, 1,9-nonane diol, and 2-methyl-1,8-octane diol, are given as examples of the polyhydric alcohol. As examples of the polybasic acid, phthalic acid, isophthalic acid, terephthalic acid, maleic acid, fumaric acid, adipic acid, and sebacic acid can be given. Commercially available polyester diols which can be used include, for example, Kurapole P-2010, PMIPA, PKA-A, PKA-A2, PNA-2000 (manufactured by Kuraray Co.).

A polycarbonate of polytetrahydrofuran and a polycarbonate of 1,6-hexane diol can be given as examples of the polycarbonate diol. The polycarbonate diols can also be commercially available under the trademarks, for example, of DN-980, DN-981, DN-982, DN-983 (manufactured by Nippon Polyurethane), PC-8000 (manufactured by PPG of the US), and PC-THF-CD (manufactured by BASF).

Given as examples of the polycaprolactone diol are polycaprolactone diols obtained by the reaction of ε-caprolactone and a diol. Such a diol may be, for example, ethylene glycol, polyethylene glycol, propylene glycol, polypropylene glycol, tetramethylene glycol, polytetramethylene glycol, 1,2-polybutylene glycol, 1,6-hexane diol, neopentyl glycol, 1,4-cyclohexane dimethanol, and 1,4-butane diol. These polycaprolactone diols can be also commercially available under the trademarks such as PLACCEL 205, 205AL, 212, 212AL, 220, 220AL (manufactured by Daicel Chemical Industries, Ltd.).

Polyols other than the above-described polyol compounds can be used. Such other polyols may be for example, dimethylol compounds of ethylene glycol, propylene glycol, 1,4-butane diol, 1,5-pentane diol, 1,6-hexane diol, neopentyl glycol, 1,4-cyclohexane dimethanol, hydrogenated bisphenol A, hydrogenated bisphenol F, or dicyclopentadiene; tricyclodecane dimethanol, pentacyclopentadecane dimethanol, β-methyl-δ-valerolactone, polybutadiene with terminal hydroxyl groups, hydrogenated polybutadiene with terminal hydroxyl groups, castor oil-modified polyol, and dimethylpolysiloxane carbitol-modified polyols.

The molecular weight of these polyols in terms of the number average molecular weight based on polystyrene standard, measured by gel permeation chromatography, is usually 50–15,000, and preferably 100–8,000.

The reaction for obtaining the dialkylpolysiloxane compound containing a polyol structure may be carried out, for example, by i) reacting a silicone compound having two reactive terminal groups, a polyol compound, a polyisocyanate compound, and a (meth)acrylate having a hydroxyl group all together; ii) reacting a polyol and a polyisocyanate, and then reacting the silicone compound and the (meth)acrylate compound having a hydroxyl group; iii) reacting the polyisocyanate, the silicone compound, and the (meth)acrylate having a hydroxyl group, and then reacting the resulting product with the polyol compound; iv) reacting the polyisocyanate and the silicone compound, then reacting the polyol compound, and finally reacting the (meth)acrylate having a hydroxyl group; or v) reacting the polyisocyanate and the (meth)acrylate having a hydroxyl group, then reacting the polyol compound, and finally reacting the silicone compound.

In a preferred form of the polyalkylpolysiloxane compound, represented by Formula (I), R and R' represent an alkyl groups having from 1 to 4 carbon atoms, preferably methyl. T and T' independently represent a group comprising at least one radiation curable moiety or alcohol residue and at least one urethane and/or urea bond, more preferably two urethane and/or urea groups and a radiation curable moiety including vinyl, (meth)acrylate and (meth)acryloyl moieties. These dialkylpolysiloxane compounds may be used either individually or in combinations of two or more.

Preferably, the dialkylpolysiloxane compound comprises one or more radiation curable groups. It is more preferred that the dialkylpolysiloxane compound comprises an average 1.7–2.1 radiation curable groups, and particularly about 2.

It is desirable that these dialkylpolysiloxanes having at least two urethane bonds and/or urea bonds in the terminal groups be dispersed in a resin composition as particles. To be dispersed in the resin composition as particles, the dialkylpolysiloxane compounds are preferably present in the liquid curable composition in an amount of between 0.05–8 wt %, and particularly preferably between 0.1–7 wt %. If less than 0.05 wt % of the dialkylpolysiloxane compounds are present, they may be mutually dissolved in the liquid composition without forming dispersible particles; if more than 8 wt % of the polyalkylpolysiloxane compounds are present, the shelf-life of the liquid curable composition may be affected, for instance shortened. It is particularly preferred for the dialkylpolysiloxane compound to be present in the liquid resin composition in an amount of between 0.1 to less than 4 wt %. Herein "dispersion of particles" refers to the state where fine particles, viewable under 500×–2,000× magnification, of the dispersed phase are present within the continuous phase or medium, for example, the liquid resin composition.

The dialkylpolysiloxane compounds of the present invention, which may be represented by Formula (I), have a number average molecular weight reduced to polystyrene of 800–15,000, preferably 900–10,000, and more preferably 1,000–7,000. If the number average molecular weight is less than 800, the cured product produced from the composition may not have a sufficient surface slip characteristic; if the number average molecular weight is more than 15,000, the composition employing product produced from the composition may have poor liquid shelf-life.

The particle size of the dialkylpolysiloxane compound dispersed in the liquid resin can be controlled by the molecular structure of the compound, the degree of stirring, and the like, and is usually in the range of 0.1 –10 μm, preferably 0.2–8 μm, more preferably 0.5–5 μm, and more preferably 0.5–2.0 μm. The dispersion particles within these ranges can be obtained by stirring the above-described dialkylpolysiloxane compound and the below-mentioned urethane (meth)acrylate under heat at 40° C.–60° C. If the particle size of the dialkylpolysiloxane compound dispersed in the liquid resin is larger than 10 μm due to insufficient stirring, the resulting composition will typically have a shorter shelf-life.

The liquid curable resin composition of the present invention may be formulated with other silicone additives in an amount not adversely affecting the shelf-life, specifically, 0.05–2 wt %, more preferably 0.05–1 wt %, of the total amount of the composition. Given as examples of such silicone additives are dimethylpolysiloxane-polyethylene alkylene copolymers such as dimethylpolysiloxane-polyoxyethylene copolymer, dimethylpolysiloxane-polyoxypropylene copolymer, dimethylpolysiloxane-polyoxyethylene-polyoxypropylene copolymer, and dimethylpolysiloxane with a carbinol group introduced into the side chain. These silicone additives are also commercially available under the trademarks such as, for example, DC-57, DC-190 (manufactured by Dow Corning Co.), SH-28PA, SH-29PA, SH-30PA, SH-190, SH-510 (manufactured by Toray-Dow Corning-Silicone Co.), KF351, KF352, KF353, KF354 (manufactured by Shin-Etsu Chemical Co., Ltd.), and L-700, L-7002, L-7500, FK-024-90, (manufactured by Nippon Unicar Co., Ltd.).

The liquid curable resin composition of the present invention may contain a urethane (meth)acrylate obtained by the reaction of a polyol, a diisocyanate, and a (meth)acrylate containing a hydroxyl group. Such a urethane (meth)acrylate can be produced by reacting the isocyanate group of the diisocyanate and the hydroxyl group of the polyol and the (meth)acrylate containing a hydroxyl group. This reaction may be carried out, for example, by a method of i) reacting the polyol, the diisocyanate, and the (meth)acrylate having a hydroxyl group altogether; ii) reacting the polyol and the diisocyanate, and then reacting the resulting product with the (meth)acrylate having a hydroxyl group; iii) reacting the diisocyanate and the (meth)acrylate having a hydroxyl group, and then reacting the resulting product with the polyol; or iv) reacting the diisocyanate and the (meth)acrylate having a hydroxyl group, reacting the resulting product with the polyol, and then again reacting the product thereby obtained with the (meth)acrylate having a hydroxyl group.

The same polyol compounds, diisocyanate compounds, and (meth)acrylate compounds having a hydroxyl group as mentioned above can be used in these reactions.

The polyol, the diisocyanate, and the (meth)acrylate containing a hydroxyl group are used preferably in a proportion such that for one equivalent of the hydroxyl group of the polyol, 1.1–3 equivalents of the isocyanate group contained in the diisocyanate and 0.2–1.5 equivalents of the hydroxyl group contained in the (meth)acrylate are used. In addition, it is desirable that the equivalent of the hydroxy groups in the polyol and the (meth)acrylate is almost the same as the equivalent of the isocyanate group in the diisocyanate.

The above noted urethane reactions may be assisted by introducing a urethane catalyst such as copper naphthenate, cobalt naphthenate, zinc naphthenate, n-butyl-tin-dilaurylate, triethylamine, 1,4-diazabicyclo[2.2.2]octane, or 2,6,7-trimethyl-1,4-diazabicyclo[2.2.2]octane, generally, in an amount of 0.01 to 1 part by weight for 100 parts by weight of the reaction raw materials. The reaction temperature is normally in the range of 10–90° C., preferably of 30–80° C.

Besides these components, a urethane (meth)acrylate obtained by reacting two mols of urethane (meth)acrylate containing a hydroxyl group with one mol of diisocyanate can be incorporated into the liquid curable resin composition of the present invention. Given as examples of such a urethane (meth)acrylates are the reaction product of hydroxyethyl (meth)acrylate and 2,5(or 2,6)-bis-(isocyanatemethyl)bicyclo[2.2.1]-heptane, the reaction product of hydroxyethyl (meth)acrylate and 2,4-toluene diisocyanate, the reaction product of hydroxyethyl (meth)acrylate and isophorone diisocyanate, the reaction product of hydroxypropyl (meth)acrylate and 2,4-toluene diisocyanate, and the reaction product of hydroxypropyl (meth)acrylate and isophorone diisocyanate.

The urethane (meth)acrylate thus obtained is incorporated in the composition in an amount of 10–90% by weight. The amount of 20–70% by weight is more preferred, especially in the case where excellent coatability to the optical fiber, superior tensile break strength and tensile elongation at break of the coated material after cure, and long-term reliability of the products are desired.

In addition to the urethane (meth)acrylates, polymerizable monomers containing a vinyl group or a (meth)acryloyl group can be added to the liquid curable resin composition of the present invention. Monofunctional monomers and polyfunctional monomers are included in such polymerizable monomers. Given as examples of the monofunctional monomers are monomers containing a vinyl group, such as N-vinyl pyrrolidone, N-vinyl caprolactam, vinyl immidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, 2-hydroxyethyl (meth)acrylate, 2-hydroxypropyl (meth) acrylate, 2-hydroxybutyl (meth)acrylate, methyl (meth) acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth) acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth) acrylate, benzyl (meth)acrylate, phenoxyethyl (meth) acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth) acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formulas (4) to (6):

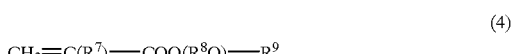

(4)

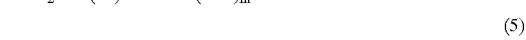

(5)

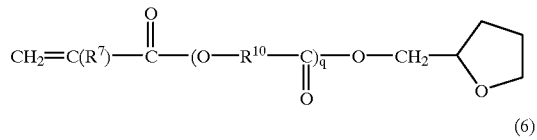

(6)

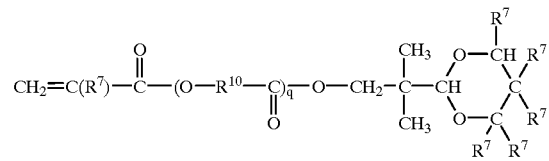

wherein $R^7$ represents a hydrogen atom or a methyl group, $R^8$ represents an alkylene group containing 2–6, preferably 2–4 carbon atoms, $R^9$ represents a hydrogen atom or an alkyl group containing 1–12, preferably 1–9 carbon atoms, $R^{10}$ represents an alkylene group containing 2–8, preferably 2–5 carbon atoms, m denotes an integer from 0–12, preferably from 1–8, and q denotes an integer from 1–8, preferably from 1–4.

Among these monofunctional monomers, isobornyl (meth)acrylate, lauryl (meth)acrylate, and phenoxyethyl (meth)acrylate are particularly preferable. Commercially available monofunctional compounds include ARONIX M111, M113, M114, M117 (manufactured by Toagosei Co., Ltd.), KAYARAD TC110S, R629, R644 (manufactured by Nippon Kayaku Co., Ltd.), and Viscoat 3700 (manufactured by Osaka Organic Chemical Industry, Co., Ltd.).

Examples of the polyfunctional monomers include monomers containing (meth)acryloyl group such as trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanediyldimethyl di(meth)acrylate, and di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated busphenol A, and triethylene glycol divinyl ether. Given as commercially available polyfunctional monomers are YUPIMER-UV, SA1002, SA2007 (manufactured by Mitsubishi Chemical Corp.), Viscoat 700 (manufactured by Osaka Organic Chemical Industry Co., Ltd.), KAYARAD R-604, DPCA-20, DPCA-30, DPCA-60, DPCA-120, HX-620, D-310, D-330, (manufactured by Nippon Kayaku Co., Ltd.), and ARONIX M-210, M-215, M-315, M-325 (manufactured by Toagosei Co., Ltd.). Among these polyfunctional monomers, tricyclodecanediyldimethyl di(meth) acrylate and diacrylate of polyoxyalkylated bisphenol A are particularly preferred.

These polymerizable monomers are preferably added to the composition in an amount of less than 80 wt %, and particularly preferably 20–70 wt %. If this amount is more than 80 wt %, the curing speed may be slow.

The liquid curable resin composition of the present invention can be cured by heat or radiation. The radiation here means radiation such as infrared lights, visible light, ultraviolet light, X-rays, electron beam, α-rays, β-rays, and γ-rays.

The liquid curable resin composition of the present invention can be used with a polymerization initiator added to it. Either a thermal initiator or a photo initiator can be used as the polymerization initiator. Preferably, a photoinitiator is used.

When the liquid curable resin composition of the present invention is cured by heat, a peroxide or an azo compound is usually used as a thermal initiator. Benzoyl peroxide, t-butyloxybenzoate, and azobisisobutyronitrile are given as specific examples.

When the liquid curable resin composition of the present invention is cured by radiation, a photo initiator is used. As required, a photosensitizer is added. Here, examples of the photo initiator include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenyl-phosphine oxide, and bis(2,6-dimethoxybenzoyl)-2,4,4-trimethylpentylphosphine oxide; and commercially available products, such as Irgacure 184, 369, 651, 500, 907, CGI1700, CGI1750, CGI1850, CG24-61 (manufactured by Ciba Geigy), Lucirin LR8728 (manufactured by BASF), Darocure 1116, 1173 (manufactured by Merck Co.), and Uvecryl P36 (manufactured by UCB). Given as examples of the photosensitizers are triethylamine, diethylamine, N-methyldiethanolamine, ethanolamine, 4-dimethylaminobenzoic acid, methyl 4-dimethylaminobenzoate, ethyl 4-dimethylaminobenzoate, isoamyl 4-dimethylaminobenzoate, and commercially available products such as Uvecryl P102, P103, P104, and P105 (manufactured by UCB Co).

When the liquid curable resin composition of the present invention is cured by heat and radiation, the above-described thermal initiators and photo initiators may be used together. The polymerization initiators are used in an amount of 0.1–10 wt %, preferably 0.5–7 wt %, in the composition.

Beside the above components, the liquid curable resin composition of the present invention may be formulated with other curable oligomers or polymers to the extent that the effect of the present invention is not adversely affected.

Included in the examples of the other curable oligomers or polymers are polyester (meth)acrylates, epoxy (meth) acrylates, polyamide (meth)acrylates, and reactive polymers which are obtained by the reaction of acrylic acid and a copolymer of glycidyl (meth)acrylate and other polymerizable monomer.

Furthermore, amines may be added to the liquid curable resin composition of the present invention to suppress generation of hydrogen gas which causes a transmission loss of optical fibers. The amines which can be added include diallylamine, diisopropylamine, diethylamine, and diethylhexylamine.

Beside these, various additives may be added as required, such as antioxidants, UV absorbers, photo-stabilizers, silane coupling agents, thermal polymerization inhibitors, leveling agents, coating surface improvers, heat polymerization inhibitors, leveling agents, surfactants, coloring matters, preservatives, plasticizers, lubricants, solvents, fillers, antioxidant, and wettability improvers. Commercially available antioxidants which can be used are Irganox 1010, 1035, 1076, 1222 (manufactured by Ciba Geigy), Antigene P, 3C, FR, GA-80 (manufactured by Sumitomo Chemical Co., Ltd.), and the like. As UV absorbers, Tinuvin P, 234, 320, 326, 327, 328, 329, 213 (manufactured by Ciba Geigy), Seesorb 102, 103, 110, 501, 202, 712, 704 (manufactured by Shipro Kasei K.K.) can be given. Commercially available photo-stabilizers which can be added include Tinuvin 292, 144, 622LD (manufactured by Ciba Geigy), Sanol LS770 (manufactured by Sankyo Chemical Industries, Ltd.), and SUMISORB TM-061 (manufactured by Sumitomo Chemical Co., Ltd.). Examples of silane coupling agents which can be given are 4-aminopropyltriethoxy silane, g-mercaptopropyltrimethoxy silane, y-methacryloxypropyltrimethoxy silane, and commercial products such as SH6062, SH6030 (manufactured by Toray-Dow Coming-Silicone Co.) and KBE903, KBE603, KBE403 (manufactured by Shin-Etsu Chemical Co. Ltd.). As the leveling agent, silicone additives such as dimethylsiloxane polyether and commercially available products, such as DC-57, DC-190 (manufactured by Dow Coming Co.), SH-28PA, SH-29PA, SH-30PA, SH-190 (manufactured by Toray-Dow Coming-Silicone Co.), KF351, KF352, KF353, KF354 (manufactured by Shin-Etsu Chemical Co., Ltd.), and L-700, L-7002, L-7500, FK-024-90 (manufactured by Nippon Unicar Co., Ltd.), can be given as examples.

The viscosity of the liquid curable resin composition of the present invention is normally in the range of 200 to 20,000 cp at 25° C., and preferably 2,000 to 15,000 cp at 25° C.

When the composition is used as a ribbon matrix material or a bundling material for optical fibers, the Young's modulus of the composition after cure is normally 10–250 kg/mm$^2$, and preferably 20–150 kg/mm$^2$.

It is desirable that the liquid curable resin composition, when cured, has surface slip characteristics of less than 2 kg/cm$^2$, preferably between 0.1–1.5 kg/cm$^2$, more preferably between 0.1–1.0 kg/cm$^2$. If the surface slip characteristics are more than 1.5 kg/cm$^2$, optical fiber ribbons cannot be drawn at a specific constant speed when optical fiber cables are manufactured; if less than 0.1 kg/cm$^2$, the surface of optical fiber ribbons is too slippery to be orderly wound.

The present invention will be hereinafter described in more detail by way of examples which are given for illustration of the present invention and shall not be construed as limiting the present invention. In the examples hereinafter "part(s) by weight" is simply described as "part(s)".

EXAMPLES

Synthesis of dimethylpolysiloxane Compound (SA-1)

6.2 parts of 2,4-tolylene diisocyanate, 89.6 parts of α,ω-bis[3-(2'-hydroxyethoxy)propyl]-dimethylpolysiloxane with a number average molecular weight of 2,500, and 0.02 part of 2,6-di-t-butyl-p-cresol, as a polymerization inhibitor, were charged into a reaction vessel equipped with a stirrer. The mixture was cooled with ice to a temperature of below 10° C. while stirring, at which temperature 0.08 parts of dibutyl tin dilaurate was added. Then, the mixture was stirred for one hour while controlling the temperature at 20–30° C., and for two hours at 40–50° C. After the addition of 4.2 parts of hydroxyethyl acrylate, the mixture was stirred for a further three hours while controlling the temperature at 50–60° C. The reaction was terminated when the amount of the residual isocyanate group was reduced to 0.1 wt % or less. The number average molecular weight of the resulting dimethylpolysiloxane (reduced to polystyrene, measured by gel permeation chromatography using HLC-8020O manufactured by Tosoh Corp., hereinafter the same) was 5,100. The dimethylpolysiloxane resin liquid obtained was designated as SA-1.

Synthesis of dimethylpolysiloxane Compound (SA-2)

26.5 parts of isophorone diisocyanate, 0.08 parts of dibutyl tin dilaurate, and 0.02 parts of 2,6-di-t-butyl-p-cresol were charged into a reaction vessel equipped with a stirrer, and the mixture was cooled to a temperature of below 15° C. 13.8 parts of 2-hdroxyethyl acrylate was added dropwise while stirring and controlling the temperature below 30° C. After the addition, the mixture was reacted for one hour at 30° C. Then, 59.7 parts of α,ω-[3-(2'-hydroxyethoxy) propyl]-dimethylpolysiloxane with a number average molecular weight of 500 was added and the mixture was stirred at 20–55° C. The reaction was terminated when the amount of the residual isocyanate group was reduced to 0.1 wt % or less. The number average molecular weight of the resulting dimethylpolysiloxane was 1,400. The dimethylpolysiloxane resin liquid obtained was designated as SA-2.

Synthesis of dimethylpolysiloxane Compound (SA-3)

22.8 parts of 2,4-toluene diisocyanate, 82.6 parts of α,ω-[3-(2'-hydroxyethoxy)propyl]dimethyl-polysiloxane with a number average molecular weight of 2,500, and 0.02 parts of 2,6-di-t-butyl-p-cresol, as a polymerization inhibitor, were charged into a reaction vessel equipped with a stirrer. The mixture was cooled with ice to a temperature of below 10° C. while stirring, at which temperature 0.08 parts of dibutyl tin dilaurate was added. Then, the mixture was stirred for two hours while controlling the temperature at 20–30° C., and for one hour at 40–50° C. After cooling to 20° C. or lower, 2.0 parts of ethylene glycol was added and the mixture was stirred for 0.5 hour while controlling the temperature at 20–30° C. Then, after the addition of 3.8 parts of 2-hydroxyethyl acrylate, the mixture was stirred for a further two hours while controlling the temperature at 50–60° C. The reaction was terminated when the amount of the residual isocyanate group was reduced to 0.1 wt % or less. The number average molecular weight of the resulting dimethylpolysiloxane was 6,100. The dimethylpolysiloxane resin liquid obtained was designated as SA-3.

Synthesis of dimethylpolysiloxane Compound (SA-4)

6.2 parts of 2,4-toluene diisocyanate, 89.6 parts of α,ω-[3-(2'-hydroxyethoxy)propyl]dimethyl-polysiloxane with a number average molecular weight of 500, and 0.02 parts of 2,6-di-t-butyl-p-cresol were charged into a reaction vessel equipped with a stirrer. The mixture was cooled with ice to a temperature of below 10° C. while stirring, at which temperature 0.08 parts of dibutyl tin dilaurate was added. Then, the mixture was stirred for one hour while controlling the temperature at 20–30° C., and for two hours at 40–50° C. After the addition of 4.2 parts of 2-hydroxyethyl acrylate, the mixture was stirred for a further three hours while controlling the temperature at 50–60° C. The reaction was terminated when the amount of the residual isocyanate group was reduced to 0.1 wt % or less. The number average molecular weight of the resulting dimethylpolysiloxane was 5,500. The dimethylpolysiloxane resin liquid obtained was designated as SA-4.

Synthesis of urethane acrylate (UA-1)

14 parts of 2,4-toluene diisocyanate, 0.08 parts of dibutyl tin dilaurate, 0.02 parts of 2,6-di-tert-butyl cresol, 7.7 parts of N-vinylpyrrolidone, and 15.5 parts of tricyclodecanediyldimethyl diacrylate were charged to a reaction vessel equipped with a stirrer and the mixture was cooled to 5–10° C. After the addition of 5.8 parts of 2-hydroxyethyl acrylate dropwise while controlling temperature below 10° C., the mixture was reacted for one hour at 30° C. Then, 1.7 parts of ethylene glycol and 54.7 parts of polytetramethylene glycol having a number average molecular weight of 2,000 were added and the mixture was stirred for two hours at 30–50° C. After the further addition of 0.5 parts of 2-hydroxyethyl acrylate, the reaction was continued at 50–60° C. until the amount of residual isocyanate group was reduced to 0.1 wt % or less, to obtain a resin liquid UA-0. The content of urethane acrylate in the resin liquid UA-0 was 76.8 wt %.

6.3 parts of 2,4-toluene diisocyanate, 0.01 parts of dibutyl tin dilaurate, 0.009 parts of 2,6-di-tert-butyl cresol, and 16 parts of isobornyl acrylate were charged to a reaction vessel equipped with a stirrer and the mixture was cooled to 5–10° C. After the addition of 8.4 parts of 2-hydroxyethyl acrylate dropwise while controlling temperature below 40° C., the mixture was reacted for one hour at 45–55° C. The reaction was terminated when the residual isocyanate group was reduced to 0.1 wt %. To the reaction mixture were added 2.6 parts of N-vinylpyrrolidone, 6.8 parts of tricyclodecanediyldimethyl diacrylate, 0.3 parts of 2,2'-thiodiethylenebis[3-(3,5-di-t-butyl-4-hydroxyphenyl)]-propionate, 56 parts of UA-0, and 0.1 parts of diethylamine. This mixture was stirred at 40–50° C. to obtain a transparent, homogeneous liquid resin UA-1. The content of urethane acrylate in the resin liquid UA-1 was 61.6 wt %.

Synthesis of urethane acrylate (UA-2)

16.5 parts of 2,4-toluene diisocyanate, 0.06 parts of dibutyl tin dilaurate, 0.015 parts of 2,6-di-tert-butyl-p-cresol, and 11.9 parts of SA1002 (were charged to a reaction vessel equipped with a stirrer and the mixture was cooled to 15° C. or below. After the addition of 15.25 parts of 2-hydroxyethyl acrylate dropwise while controlling temperature below 30° C., the mixture was reacted for one hour at 30° C. Then, 2.64 parts of TCD-DM (manufactured by Mitsubishi Chemical Corp.) and 28.5 parts of a ring-opening copolymer of tetrahydrofuran and 3-methyltetrahydrofuran with a number average molecular weight of 2,000 were added and the mixture was stirred at 20–55° C. until the amount of residual isocyanate group was reduced to 0.1 wt % or less. To the reaction mixture were added 7.95 parts of N-vinylpyrrolidone, 6.74 parts of IBXA (manufactured by Osaka Organic Chemical Ind. Co., Ltd.), 3.45 parts of SA10011(manufactured by Mitsubishi Chemical Corp.), 0.3 parts of Irganox 1035 (manufactured by Ciba Geigey), and 0.14 parts of 2,6-di-t-butyl-p-cresol were charged and the mixture was stirred at 50–60° C. until a transparent resin liquid UA-2 was obtained. The content of urethane acrylate in the resin liquid UA-2 was 70.0 wt %.

EXAMPLES 1–8, COMPARATIVE EXAMPLES 1–2

Preparation of Liquid Curable Resin Compositions

The components shown in Tables 1 and 2 were charged into a reaction vessel equipped with a stirrer. The mixture was stirred for 3 hours while controlling the temperature at 50–60° C. to prepare liquid curable resin compositions.

Testing Procedures

The liquid curable resin composition was cured to produce test specimens by the method described below. The test specimens were subjected to evaluation according to the following methods.

1. Preparation of Test Specimens

The liquid curable resin composition was applied to glass plates using an applicator bar with a thickness of 250 μm and irradiated with UV light at 0.5 J/cm² under nitrogen atmosphere. The cured films were aged at 23° C. and 50% RH for over 12 hours, removed from the glass plate, cut into stripes with a width of 3 cm, and secured onto an aluminum plate using a double coated adhesive tape with the irradiated surface facing upside. Two such test specimens were layered with the cured surface being face by face, secured with a double clip, and served to a surface friction force test.

2. Surface Friction Force Test

A surface performance test was carried out at a pulling rate of 50 mm/min, a surface contact area of the cured film of 0.54 cm², and pressure of 0.48 kg/cm² by the double clip using Autograph AGS-1KND manufactured by Shimazu Corp. The shear slip stress (kg/cm²) was calculated from the load at the initiation of slip.

3. Measurement of Average Particle Size

One drop of liquid curable resin composition of the present invention was placed on a slide glass. The composition was covered with a glass and a photograph was taken using an optical microscope at a magnification of 800. Depending on the sizes of the particles it may be more suitable to use a lower or higher magnification, for example 500× to 2000×. The average particle size (μm) of the particles dispersed in the liquid composition was determined from an average of 100 particles.

4. Measurement of Shelf-Life

To evaluate the shelf-life, the liquid curable resin composition was allowed to stand at 60° C. for 30 days, following which the liquid resin was dropped onto a glass plate to macroscopically observe separation of resin components on the surface of the liquid.

5. Measurement of Viscosity

Viscosity of the liquid curable resin compositions was measured at 25° C. using a B-type viscometer manufactured by Tokyo Keiki Co., Ltd. The results are shown in Table 2.

TABLE 1

| Component (in parts by weight) | Example | | | | | | | | Comparative | |
|---|---|---|---|---|---|---|---|---|---|---|
| | 1 | 2 | 3 | 4 | 5 | 6 | 7 | 8 | 1 | 2 |
| SA-1 | 0.1 | 0 | 0 | 0 | 0.5 | 1.0 | 0 | 0 | 0 | 0 |
| SA-2 | 0 | 1.0 | 0 | 0 | 0 | 1.0 | 1 | 0 | 0 | 0 |
| SA-3 | 0 | 0 | 3.0 | 0 | 0 | 0 | 0 | 0 | 0 | 0 |
| SA-4 | 0 | 0 | 0 | 1.0 | 1.0 | 0 | 0 | 1 | 0 | 0 |
| UA-1 | 98.3 | 95.9 | 94.0 | 97.4 | 97.0 | 96.5 | 0 | 0 | 98.5 | 94.5 |
| UA-2 | 0 | 0 | 0 | 0 | 0 | 0 | 97 | 98 | 0 | 0 |
| Photoinitiator (a) | 0 | 0 | 0 | 1.5 | 0 | 0 | 0 | 1.5 | 0 | 0 |
| Photoinitiator (b) | 1.5 | 0 | 0 | 0 | 1.5 | 1.5 | 0 | 0 | 1.5 | 0 |
| Photoinitiator (c) | 0 | 3.0 | 3.0 | 0 | 0 | 0 | 3 | 0 | 0 | 3.0 |
| Coating surface improver (d) | 0.1 | 0.1 | 0.0 | 0.1 | 0 | 0 | 0.1 | 0.1 | 0 | 1.5 |

Table Notes:
(a) 2,4,6-Trimethylbenzoyldiphenylphosphine oxide
(b) A mixture of bis(2,6-dimethoxybenzoyl)-2,4,4-trimethylpentylphosphine oxide and 1-hydroxycyclohexyl phenyl ketone (weight ratio: 50:50)
(c) 1-Hydroxycyclohexyl phenyl ketone
(d) Graft copolymer of dimethylsiloxane polycarbinol

TABLE 2

| | Surface slip characteristic (kg/cm²) | Average particle size (μm) | Storage stability of the liquid [2] | Viscosity (cps @ 25° C.) |
|---|---|---|---|---|
| Example 1 | 0.5 | 1.5 | > | 7900 |
| Example 2 | 0.8 | 1.5 | > | 7000 |
| Example 3 | 0.3 | 1.6 | > | 8400 |
| Example 4 | 0.8 | 1.7 | > | 7000 |
| Example 5 | 0.4 | 1.9 | > | 8400 |
| Example 6 | 0.4 | 1.8 | > | 8000 |

TABLE 2-continued

| | Surface slip characteristic (kg/cm$^2$) | Average particle size (μm) | Storage stability of the liquid [2] | Viscosity (cps @ 25° C.) |
|---|---|---|---|---|
| Example 7 | 0.5 | 1.5 | > | 6700 |
| Example 8 | 0.8 | 1.5 | > | 7000 |
| Comparative Example 1 | >9 | (1) | > | 8000 |
| Comparative Example 2 | 2.6 | 2.3 | X | 8300 |

Table Notes:
1) There were no particles dispersed in the liquid resin.
2) >: Stability was good; X: Separation of resin components was observed on the liquid surface.

As fully illustrated above, the liquid curable resin composition of the present invention exhibits superior shelf life in a liquid state and, after curing, has a superior surface slip characteristics. The resin composition is therefore particularly suitable as a coating material for optical fibers, woods, plastic sheets, and the like. When used for the manufacture of optical fiber ribbons, this liquid curable resin composition does not require a lubricant such as silicone oil or talc. When used as a coating material for woods and plastics, excellent sliding characteristics and the effect of preventing adherence among the materials used can be expected.

What is claimed is:

1. A liquid curable resin composition comprising dispersed particles of a dialkylpolysiloxane having at least two terminal groups each having at least one urethane bond and/or urea bond.

2. The liquid curable resin composition of claim 1, wherein said dialkylpolysiloxane has a number average molecular weight of 800–15,000.

3. The liquid curable resin composition of claim 1, wherein said dialkylpolysiloxane has a number average molecular weight of 1,000–7,000.

4. The liquid curable resin composition of claim 1, wherein the size of said particles is between 0.1–10 μm.

5. The liquid curable resin composition of claim 1, wherein the size of said particles is between 0.5–5 μm.

6. The liquid curable resin composition of claim 1, wherein said dialkylpolysiloxane is present, relative to the weight of the total composition, in an amount of 0.05–8 wt %.

7. The liquid curable resin composition of claim 1, wherein said dialkylpolysiloxane is obtained by reacting (a) hydroxy and/or amino terminated siloxane, (b) a polyisocyanate, and (c) a radiation-curable hydroxy compound or alcohol.

8. The liquid curable resin composition of claim 1, wherein said composition comprises an urethane (meth) acrylate oligomer and a reactive diluent.

9. A liquid curable resin dispersion comprising dispersed particles of a dialkylpolysiloxane represented by Formula (I):

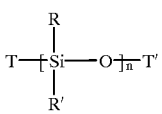

wherein
T and T' independently represent terminal groups comprising at least one urethane or urea bond;
R and R' independently represent alkyl groups; and
n represents an integer from 5 to 150.

10. The liquid curable resin dispersion of claim 9, wherein R and R' are methyl.

11. The liquid curable resin dispersion of claim 9, wherein T and T' comprise at least one urethane or urea bond and at least one curable group.

12. The liquid curable resin dispersion of claim 9, wherein T and T' comprise at least one urethane or urea bond and at least one radiation-curable group.

13. The liquid curable resin dispersion of claim 9, wherein said composition has a viscosity of 200 to 2,000 cp at 25° C.

* * * * *